(12) United States Patent
Liu et al.

(10) Patent No.: US 11,216,913 B2
(45) Date of Patent: Jan. 4, 2022

(54) CONVOLUTIONAL NEURAL NETWORK PROCESSOR, IMAGE PROCESSING METHOD AND ELECTRONIC DEVICE

(71) Applicant: BOE Technology Group Co., Ltd., Beijing (CN)

(72) Inventors: Hanwen Liu, Beijing (CN); Pablo Navarrete Michelini, Beijing (CN); Dan Zhu, Beijing (CN); Lijie Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 66 days.

(21) Appl. No.: 16/855,063

(22) Filed: Apr. 22, 2020

(65) Prior Publication Data

US 2021/0097649 A1  Apr. 1, 2021

(30) Foreign Application Priority Data

Sep. 30, 2019  (CN) .......................... 201910940055.3

(51) Int. Cl.
| | |
|---|---|
| *G06T 5/00* | (2006.01) |
| *G06T 3/40* | (2006.01) |
| *G06T 5/20* | (2006.01) |
| *G06N 3/08* | (2006.01) |

(52) U.S. Cl.
CPC .............. *G06T 5/002* (2013.01); *G06N 3/08* (2013.01); *G06T 3/4046* (2013.01); *G06T 5/20* (2013.01); *G06T 2207/20081* (2013.01); *G06T 2207/20084* (2013.01); *G06T 2207/20182* (2013.01)

(58) Field of Classification Search
CPC ......... G06T 5/002; G06T 3/4046; G06T 5/20; G06T 2207/20081; G06T 2207/20084; G06T 2207/20182; G06N 3/08
USPC ........................................................ 382/157
See application file for complete search history.

(56) References Cited

U.S. PATENT DOCUMENTS

2020/0097772 A1* 3/2020 Nakanishi ................ G06K 9/40
2020/0151559 A1* 5/2020 Karras ................... G06N 3/088

OTHER PUBLICATIONS

Duan, "Clustering Mixed Data Based on Density Peaks and Stacked Denoising Autoencoders" MDPI Jan. 2019 (Year: 2019).*
Monn, "Denoising Autoencoders explained" (Year: 2017).*

* cited by examiner

*Primary Examiner* — Mark Roz
(74) *Attorney, Agent, or Firm* — Arent Fox LLP; Michael Fainberg

(57) ABSTRACT

The present disclosure discloses a convolutional neural network processor, an image processing method and an electronic device. The method includes: receiving, by the first convolutional unit, the input image to be processed, extracting the N feature maps with different scales in the image to be processed, sending the N feature maps to the second convolutional unit, and sending the first feature map to the processing unit; fusing, by the processing unit, the received preset noise information and the first feature map, to obtain the second feature map, and sending the second feature map to the second convolutional unit; and fusing, by the second convolutional unit, the received N feature maps with the second feature map to obtain the processed image.

17 Claims, 9 Drawing Sheets

S1001 — a first convolutional unit receives an input image to be processed, N feature maps with different scales in the image to be processed are extracted, the N feature maps are sent to a second convolutional unit, and a first feature map is sent to a processing unit, where N is a positive integer, the first feature map is the feature map with the smallest scale in the N feature maps, the image to be processed and the feature maps are all presented in a matrix form, and the feature maps represent image feature information, such as luminance information of the image to be processed S1002 — the processing unit fuses the received preset noise information and the first feature map, to obtain a second feature map, and the second feature map is sent to the second convolutional unit, where the noise information includes preset luminance information S1003 — the second convolutional unit fuses the received N feature maps with the second feature map to obtain a processed image

Fig. 10

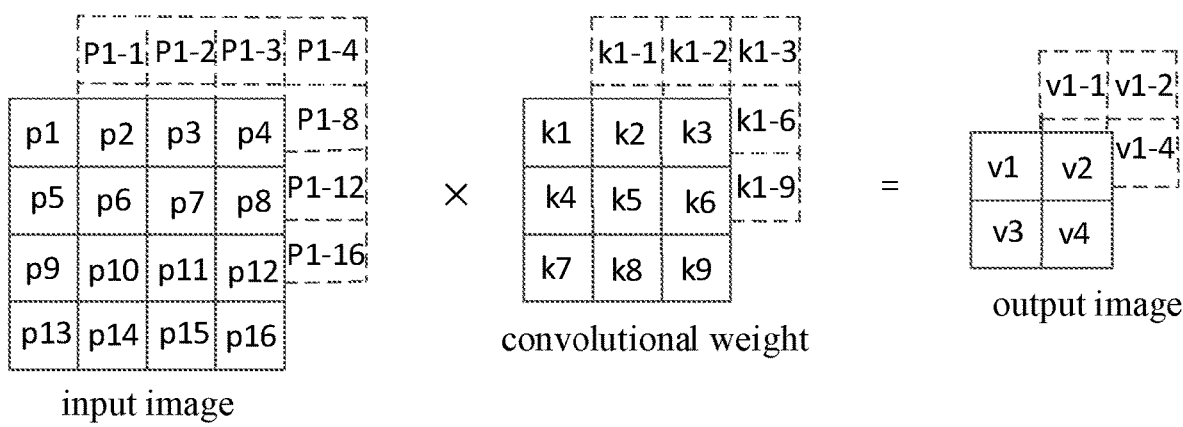

Fig. 11

CONVOLUTIONAL NEURAL NETWORK PROCESSOR, IMAGE PROCESSING METHOD AND ELECTRONIC DEVICE

The present application claims the priority from Chinese Patent Application No. 201910940055.3, filed with the Chinese Patent Office on Sep. 30, 2019, and entitled "CONVOLUTIONAL NEURAL NETWORK PROCESSOR, IMAGE PROCESSING METHOD AND ELECTRONIC DEVICE", which is hereby incorporated by reference in its entirety.

FIELD

The present application relates to the technical field of image processing, in particular to a convolutional neural network processor, an image processing method and an electronic device.

BACKGROUND

With the rapid development of image processing technologies, people have higher and higher requirements for image quality. The image enhancement technology is widely used in over-exposed or under-exposed image processing for its advantages of improving image contrast and viewing effect.

At present, in order to improve the efficiency of image processing, convolutional neural networks are often used to process a low-quality image into a high-quality image. However, in the prior art, during image processing using convolutional neural networks, a dense link architecture is adopted to process the image as a whole, so in the process of image processing, not only luminance information but also chrominance information need to be processed, which makes the workload of image processing using the convolutional neural networks large and further reduces the efficiency of image processing.

SUMMARY

The present disclosure provides a convolutional neural network processor, an image processing method and an electronic device. In a first aspect, the embodiments of the present disclosure provide a convolutional neural network processor, including a first convolutional unit, a processing unit and a second convolutional unit; where the first convolutional unit includes N first convolutional layers connected in sequence, and is configured to extract N feature maps with different scales in an image to be processed, where N is a positive integer, each first convolutional layer is configured to extract one feature map;

the processing unit is connected with the first convolutional unit and the second convolutional unit, and is configured to fuse at least one piece of preset noise information received and a first feature map with a smallest scale in the N feature maps with different scales extracted by the first convolutional unit to obtain a fused second feature map; and the second convolutional unit includes N second convolutional layers connected in sequence, and is configured to fuse the N feature maps extracted by the first convolutional unit with the second feature map to obtain a processed image.

Alternatively, the convolutional neural network processor further includes: 2N sampling units, where first N sampling units are scrambling units, an output end of each first convolutional layer is provided with a scrambling unit, which is configured to down-sample a feature image output by each first convolutional layer, and output of each scrambling unit serves as input of next first convolutional layer; and last N sampling units are merging units, and an output end of each second convolutional layer is provided with a merging unit, which is configured to up-sample a feature image output by each second convolutional layer.

Alternatively, the convolutional neural network processor further includes N interlayer connections configured to directly input an output of each first convolutional layer into a corresponding second convolutional layer, where the first convolutional layers are in one-to-one correspondence to the second convolutional layers.

Alternatively, the processing unit includes a plurality of convolutional blocks connected in sequence, and output of each of the convolutional blocks is input of all subsequent convolutional blocks, where each of the convolutional blocks includes a third convolutional layer and a fourth convolutional layer.

Alternatively, the convolutional neural network processor further includes N+1 fifth convolutional layers, where the fifth convolutional layers are disposed at input ends of the processing unit and each of the second convolutional layers for performing superposition processing on a plurality of input data.

Alternatively, each first convolutional layer, each second convolutional layer, each third convolutional layer, each fourth convolutional layer, and each fifth convolutional layer include a 1×1 convolutional kernel, respectively.

Alternatively, the noise information includes first noise information and second noise information, where a difference between an average value of all elements in the first noise information and a maximum luminance grayscale is smaller than a first preset threshold, and a difference between an average value of all elements in the second noise information and a minimum luminance grayscale is smaller than a second preset threshold.

In a second aspect, the embodiments of the present disclosure provide an image processing method, applied to the convolutional neural network processor described in the first aspect, and the method includes:

receiving, by the first convolutional unit, the input image to be processed, extracting the N feature maps with different scales in the image to be processed, sending the N feature maps to the second convolutional unit, and sending the first feature map to the processing unit, where N is the positive integer, the first feature map is the feature map with the smallest scale in the N feature maps with different scales;

fusing, by the processing unit, the received preset noise information and the first feature map, to obtain the second feature map, and sending the second feature map to the second convolutional unit; and fusing, by the second convolutional unit, the received N feature maps with the second feature map to obtain the processed image.

Alternatively, the extracting the N feature maps with different scales in the image to be processed includes:

acquiring, by each first convolutional layer in the first convolutional unit, a preset first convolutional weight matrix; and performing, by each first convolutional layer, convolutional operation on a feature map output by a previous adjacent convolutional layer and the first convolutional weight matrix corresponding to the each first convolutional layer, to obtain the N feature maps with the different scales.

Alternatively, the convolutional operation, performed by each first convolutional layer, on the feature map output by the previous adjacent convolutional layer and the first convolutional weight matrix corresponding to the each first convolutional layer includes:

if any first convolutional layer is a first one of the convolutional layers in the first convolutional unit, performing, by the any first convolutional layer, convolutional operation on the image to be processed and a first convolutional weight matrix corresponding to the any first convolutional layer to obtain a feature map; or if any first convolutional layer is not the first one of the convolutional layers in the first convolutional unit, performing, by the any first convolutional layer, convolutional operation on the feature map output by the previous adjacent first convolutional layer and a first convolutional weight matrix corresponding to the any first convolutional layer to obtain a feature map.

Alternatively, after the convolutional operation on the image to be processed and the first convolutional weight matrix corresponding to the any first convolutional layer is performed, or after the convolutional operation on the feature map output by the previous adjacent first convolutional layer and the first convolutional weight matrix corresponding to the any first convolutional layer is performed, the method further includes:

down-sampling, by a scrambling unit, the obtained feature map.

Alternatively, the fusing, by the second convolutional unit, the received N feature maps with the second feature map to obtain the processed image includes:

acquiring, by each second convolutional layer in the second convolutional unit, a preset second convolutional weight matrix; and performing, by each second convolutional layer, convolutional operation on a feature map output by a corresponding first convolutional layer and a feature map output by a previous adjacent second convolutional layer to obtain the processed image.

Alternatively, the convolutional operation, performed by each second convolutional layer, on the feature map output by the corresponding first convolutional layer and the feature map output by the previous adjacent second convolutional layer to obtain the processed image includes:

if any second convolutional layer is a first one of the convolutional layers in the second convolutional unit, performing convolutional operation on a third feature map and the second convolutional weight matrix corresponding to the any second convolutional layer to obtain a feature map, where the third feature map is obtained by stacking a received first feature map and the second feature map by a fifth convolutional layer; or if any second convolutional layer is not the first one of the convolutional layers in the second convolutional unit, stacking the feature map output by the previous adjacent second convolutional layer with a feature map output by a corresponding first convolutional layer to obtain a fourth feature map, and performing convolutional operation on the fourth feature map and the second convolutional weight matrix corresponding to the any second convolutional layer to obtain a feature map.

Alternatively, after the convolutional operation on the third feature map and any second convolutional weight matrix to obtain the feature map is performed, or after the convolutional operation on the fourth feature map and the second convolutional weight matrix corresponding to the any second convolutional layer to obtain the feature map is performed, the method further includes:

up-sampling, by a merging unit, the feature map.

Alternatively, the fusing, by the processing unit, the received preset noise information and the first feature map, to obtain the second feature map includes:

receiving, by a fifth convolutional layer between the processing unit and the first convolutional unit, the input noise information and the first feature map, and stacking the first feature map and the noise information to obtain a fifth feature map;

acquiring, by each convolutional block in the processing unit, a preset third convolutional weight matrix; and performing, by each convolutional block, convolutional operation on the feature maps output by all previous convolutional blocks and the third convolutional weight matrix corresponding to each convolutional block to obtain the second feature map.

Alternatively, the dimensions of each first convolutional weight matrix, each second convolutional weight matrix, and each third convolutional weight matrix are all 1×1.

In a third aspect, the embodiments of the present disclosure provide an electronic device, and the electronic device includes:

a memory for storing instructions executed by at least one processor; and the processor for acquiring and executing the instructions stored in the memory to implement the method described in the second aspect.

In a fourth aspect, the embodiments of the present disclosure provide a computer-readable storage medium, and the computer-readable storage medium stores computer instructions that cause the computer to perform the method described in the second aspect when executed on a computer.

BRIEF DESCRIPTION OF THE DRAWINGS

FIG. 10 is a flowchart of an image processing method provided by the embodiments of the present disclosure.

FIG. 11 is a principle diagram of a convolutional operation provided by the embodiments of the present disclosure.

DETAILED DESCRIPTION OF THE EMBODIMENTS

Figure 1:
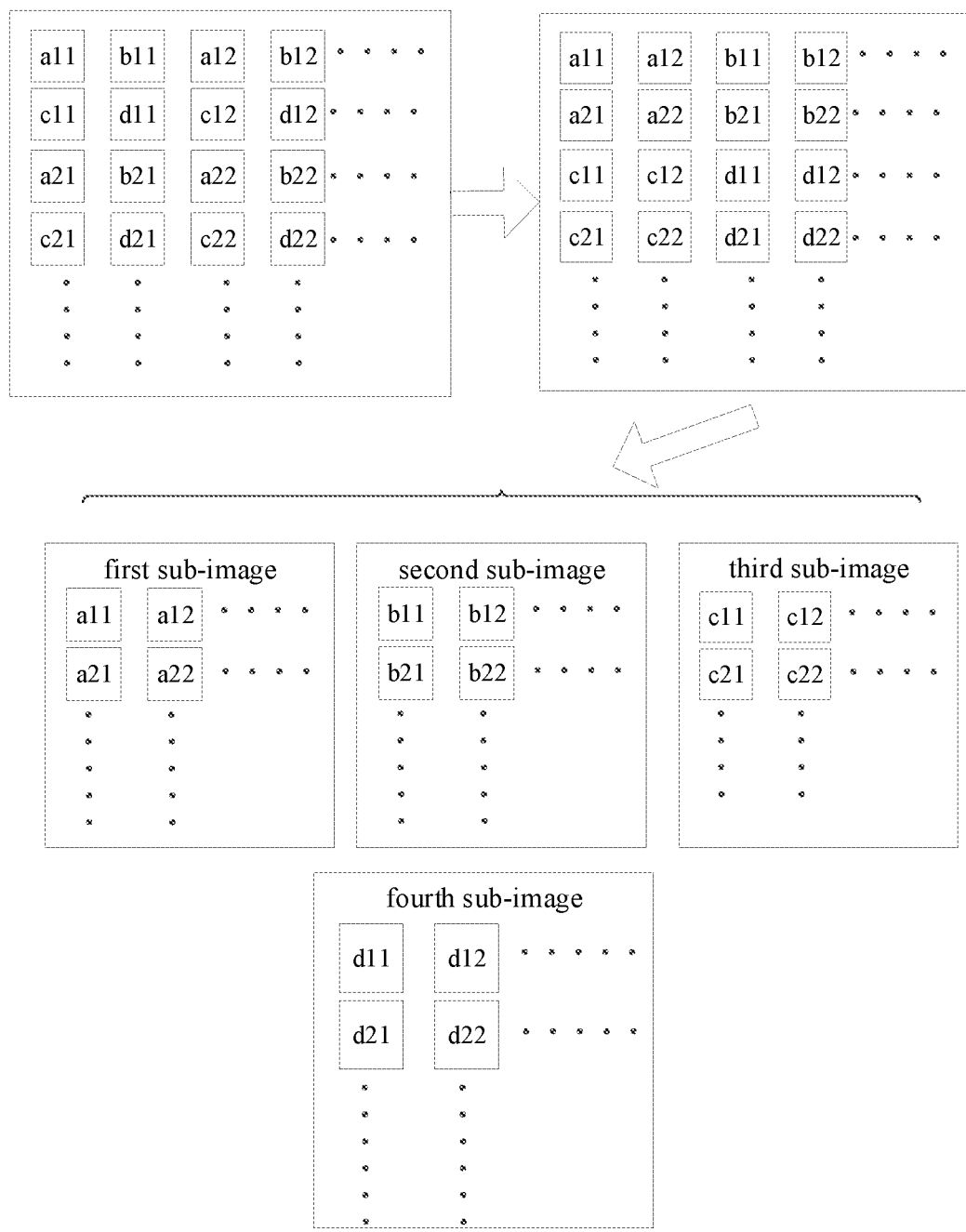
FIG. 1 is a schematic diagram of the working principle of a scrambling unit provided by the embodiments of the present disclosure.

In the solution provided by the embodiments of the present disclosure, the described embodiments are only part of the embodiments of the present disclosure, not all of the embodiments. Based on the embodiments in the present disclosure, all other embodiments obtained by those of ordinary skill in the art without creative labor are within the scope of protection of the present disclosure.

In order to better understand the above-mentioned technical solution, the technical solution of the present disclosure is described in detail below through the drawings and specific embodiments. It should be understood that the embodiments of the present disclosure and the specific features in the embodiments are the detailed description of the technical solution of the present disclosure, rather than a limitation on the technical solution of the present disclosure. Without conflict, the embodiments of the present disclosure and the technical features in the embodiments can be combined mutually.

The technical terms mentioned in the embodiments of the present disclosure will be explained below.

Convolutional Neural Network (CNN) is a kind of feed-forward neural network with convolutional calculation and with a deep structure. It is one of the representative algorithms of deep learning.

A convolutional kernel refers to a two-dimensional data matrix, and each point has a certain value, which is used to extract features of an input image or add the features to the image.

A convolutional layer includes one or more convolutional kernels for performing convolutional operation on the input image to obtain an output image.

A pooling layer is a kind of down-sampling, which is used to reduce the size of the extracted image features. Commonly used pooling layers include Max-pooling, avg-polling, decimation, demuxout, etc.

A flatten layer is configured to convert multidimensional data into one-dimensional data, and is commonly used for transition between a convolutional layer and a fully connected layer. The formula for the flatten layer is as follows:

$$v_k = f_{\frac{k}{j}, k\%j}$$

where $v_k$ refers to a vector containing k elements, and $$f_{\frac{k}{j}, k\%j}$$

refers to a matrix wan k/j rows and k % j columns.

A homogenization layer uses the mean value of feature images to represent an image and converts multidimensional feature data into one scalar datum.

A fully connected layer (FCN) has a same structure as the convolutional neural network, and uses scalar values instead of convolutional kernels.

A softmax layer refers to a logic function generator which compresses the value of each element in the k-dimensional vector so that the value range of each element is within (0,1) and the sum of all the elements in the k-dimensional vector is equal to 1, $$\sigma(z) = \frac{e^{z_j}}{\sum_{k=1}^{K} e^{z_k}}, j = 1, 2 \ldots K$$

where $\sigma(z)$ is the compressed k-dimensional vector, $e^{z_j}$ is the value of the $j^{th}$ element in the k-dimensional vector, and $\Sigma_{k=1}^{K} e^{z_k}$ represents the sum of all the elements in the k-dimensional vector.

An instance normalization unit is configured to normalize a feature map output by the convolutional layer. Specifically, the standardized formula for instance normalization is as follows:

$$y_{tijk} = \frac{x_{tijk} - \mu_{ti}}{\sqrt{\sigma_{ti}^2 + \varepsilon}}$$

$$\mu_{ti} = \frac{1}{HW} \sum_{l=1}^{W} \sum_{k=1}^{H} x_{tilk}$$

$$\sigma_{ti}^2 = \frac{1}{HW} \sum_{l=1}^{W} \sum_{k=1}^{H} (x_{tilk} - m\mu_{ti})^2$$

where $x_{tijk}$ represents values of the $t^{th}$ block, the $i^{th}$ feature map, the $j^{th}$ column, and the $k^{th}$ row in a feature map set output by any convolutional layer; H represents the number of rows of a matrix of each feature map; W represents the number of columns of the matrix of each feature map; $\mu_{ti}$ representing the mean value of each element in the $t^{th}$ block and the $i^{th}$ feature map in the feature map set output by any convolutional layer; m is a preset coefficient; and $\sigma_{ti}^2$ indicates the mean square deviation of the values of the $t^{th}$ block, the $i^{th}$ feature map, the $j^{th}$ column, and the $k^{th}$ row in the feature map set output by any convolutional layer.

A scrambling unit (Demux) is configured to rearrange pixels of the input image and dividing the rearranged image into m images, where m is a positive integer not less than 2. It should be understood that since the size of each output image of the scrambling unit is smaller than the size of the input image, the scrambling unit is essentially a kind of down-sampling, which can reduce the size of the output image. However, the scrambling unit only rearranges and segments the pixels of the input image instead of discarding the pixels in the input image, so the process of processing by the scrambling unit ensures the integrity of information of the input image.

Specifically, the scrambling unit can move the pixels in the input image according to a preset rearrangement rule or according to a preset scrambling template, and then segment the rearranged image into the plurality of output images. For example, as shown in FIG. 1, the input image is rearranged according to the preset scrambling template, that is, pixels corresponding to all elements a in the input image are arranged together, pixels corresponding to all elements b are arranged together, pixels corresponding to all elements c are arranged together, and pixels corresponding to all elements d are arranged together to obtain the rearranged image. Then the rearranged image is decomposed into four sub-images, which are the first sub-image, the second sub-image, the third sub-image and the fourth sub-image, where the first sub-image includes the pixels corresponding to all the elements a, the second sub-image includes the pixels corresponding to all the elements b, the third sub-image includes the pixels corresponding to all the element c and the fourth sub-image includes the pixels corresponding to all the elements d.

A merging unit (MUX) is configured to merge the m images into one image and performing pixel rearrangement on the merged image according to the preset rule or the template, so the merging unit is essentially an inverse operation of the scrambling unit.

Figure 2:
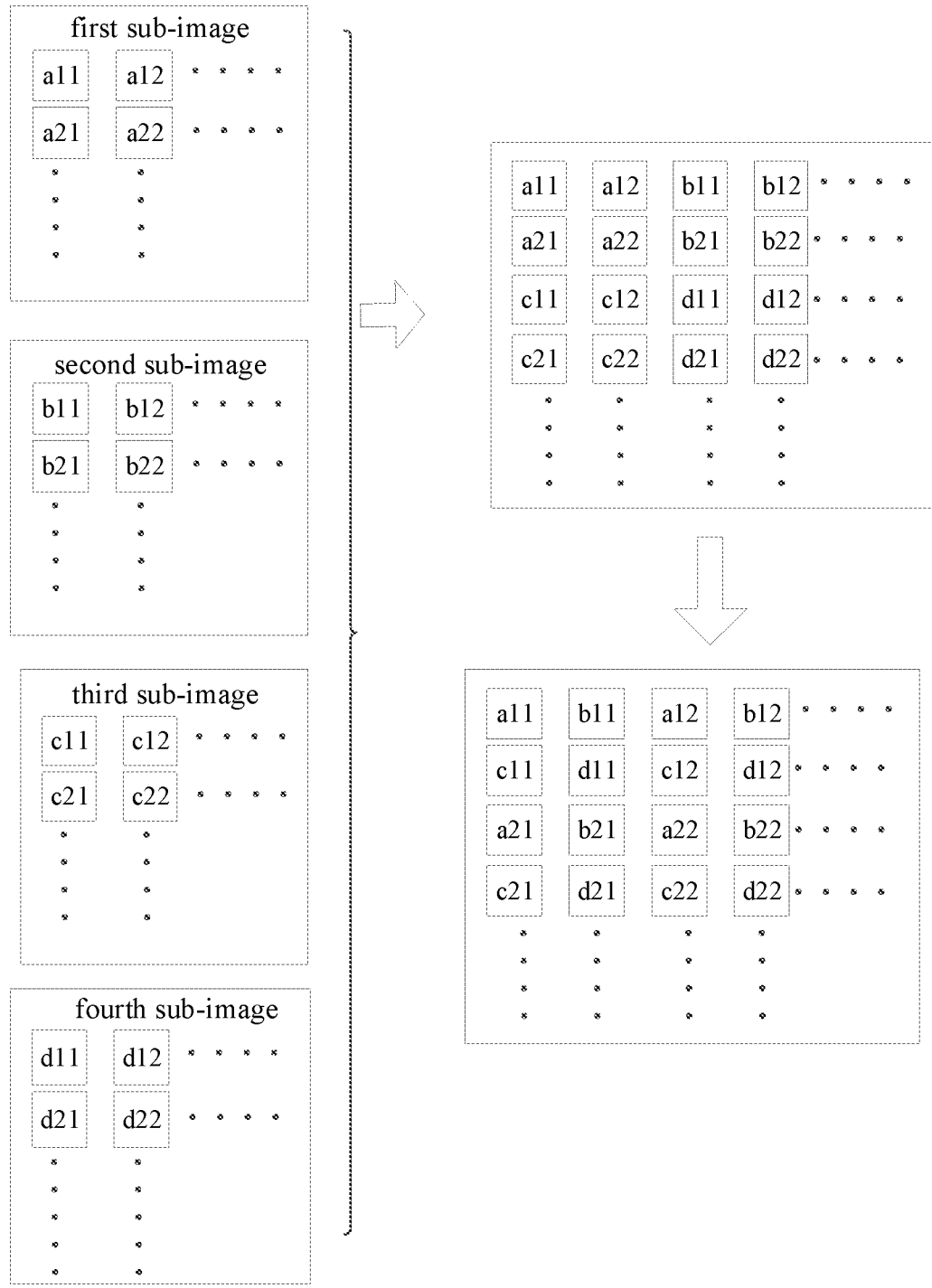
FIG. 2 is a schematic diagram of the working principle of a merging unit provided by the embodiments of the present disclosure.

For example, still taking the first sub-image, the second sub-image, the third sub-image and the fourth sub-image shown in FIG. 1 as an example. Referring to FIG. 2, the first sub-image, the second sub-image, the third sub-image and the fourth sub-image are input into the merging unit, and then the merging unit merges the first sub-image, the second sub-image, the third sub-image and the fourth sub-image to obtain a merged image, where the merged image in the merging unit is equivalent to the rearranged image in the scrambling unit. Then the merged image is rearranged according to a rearrangement mode inverse to that of FIG. 1 to obtain an image with the same size as the input image of the scrambling unit in FIG. 1.

In the solution provided by the embodiments of the present disclosure, image enhancement processing is realized through the convolutional neural network processor, original low-quality images and preset noise are input into the convolutional neural network processor, and high-quality images are obtained through processing by the convolutional neural network processor. In order to facilitate understanding of the following image enhancement process, the structure of the convolutional neural network used in the embodiments of the present disclosure will be first described.

Figure 3:
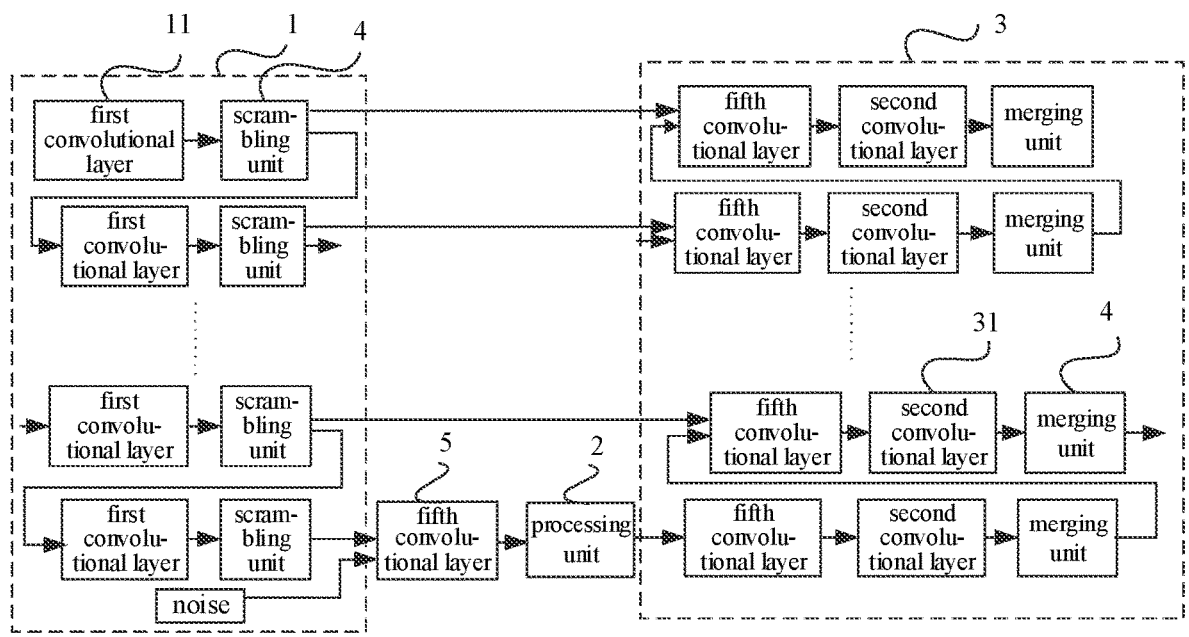
FIG. 3 is a structural schematic diagram of a convolutional neural network provided by the embodiments of the present disclosure.

Referring to FIG. 3, the embodiments of the present disclosure provide a convolutional neural network, including a first convolutional unit 1, a processing unit 2 and a second convolutional unit 3; where the first convolutional unit 1 includes N first convolutional layers 11 connected in sequence, and is configured to extract N feature maps with different scales in an image to be processed, where N is a positive integer, each first convolutional layer 11 is configured to extract one feature map, the scales of the feature maps extracted by the different first convolutional layers 11 are different, the image to be processed and the feature maps are all presented in a matrix form, and the feature maps represent image feature information, such as luminance information of the image to be processed; exemplary, the scales may represent the resolution of the image;

the processing unit 2 is connected with the first convolutional unit 1 and the second convolutional unit 3, and is configured to fuse the preset noise information received and a first feature map with a smallest scale in the N feature maps with different scales extracted by the first convolutional unit 1 to obtain a fused second feature map, where the noise information includes preset luminance information and other information, etc.; and the second convolutional unit 3 includes N second convolutional layers 31 connected in sequence, and is configured to fuse the N feature maps extracted by the first convolutional unit 1 with the second feature map to obtain a processed image.

In the embodiments of the present disclosure, referring to FIG. 3, in the convolutional neural network, the first convolutional unit 1, the processing unit 2 and the second convolutional unit 3 are connected in sequence, an image input to the first convolutional unit 1 is the original image to be processed, an image output by the second convolutional unit 3 is the processed image. Generally, output of each unit in the convolutional neural network is input of the next unit; however, in the solution provided by the embodiments of the present disclosure, the input of the processing unit 2 also includes the input preset noise information, in addition to the output of the first convolutional unit 1; where the noise information may include randomly generated luminance information or predetermined luminance information, for example, the noise information is a Gaussian signal.

It should be understood that in the embodiments of the present disclosure, in order to allow the operation of the original image to be processed input to the convolutional neural network with each layer in the convolutional neural network, the image to be processed, the feature maps and the noise information provided by the embodiments of the present disclosure are all presented in the matrix form.

In one implementation mode, the convolutional neural network further includes 2N sampling units 4, where the first N sampling units 4 are scrambling units which are arranged at an output end of each first convolutional layer 11 and configured to down-sample the feature image output by each first convolutional layer 11, and output of each scrambling unit serves as input of the next first convolutional layer 11; and the last N sampling units 4 are merging units which are arranged at an output end of each second convolutional layer 31 and configured to up-sample the feature image output by each second convolutional layer 31.

Exemplary, in order to reduce the calculation amount of the convolutional neural network for image processing, referring to FIG. 3, a scrambling unit, which is equivalent to a down-sampling unit, is arranged at the output end of each first convolutional layer 11 in the convolutional neural network for down-sampling the feature map output by each first convolutional layer 11, and the down-sampled feature map is used as input of the next first convolutional layer 11, so that the scales of the feature maps output by the different first convolutional layers s11 are different.

Further, in order to make the size of the image output by the convolutional neural network the same as that of the image to be processed, a merging unit, which is equivalent to an up-sampling unit, is arranged at the output end of each second convolutional layer 31 for up-sampling the feature map output by each second convolutional layer 31, so that the size of the image output by the last second convolutional layer 31 is the same as that of the image to be processed.

In one implementation mode, the convolutional neural network further includes N interlayer connections for directly inputting the output of each first convolutional layer 11 into the corresponding second convolutional layer 31, where the first convolutional layers 11 are in one-to-one correspondence to the second convolutional layers 31.

Referring to FIG. 3, in the convolutional neural network provided by the embodiments of the present disclosure, the first convolutional layers 11 are in one-to-one correspondence to the second convolutional layers 31, and the first convolutional layers 11 directly input the extracted feature maps to the corresponding second convolutional layers 31.

Figure 4:
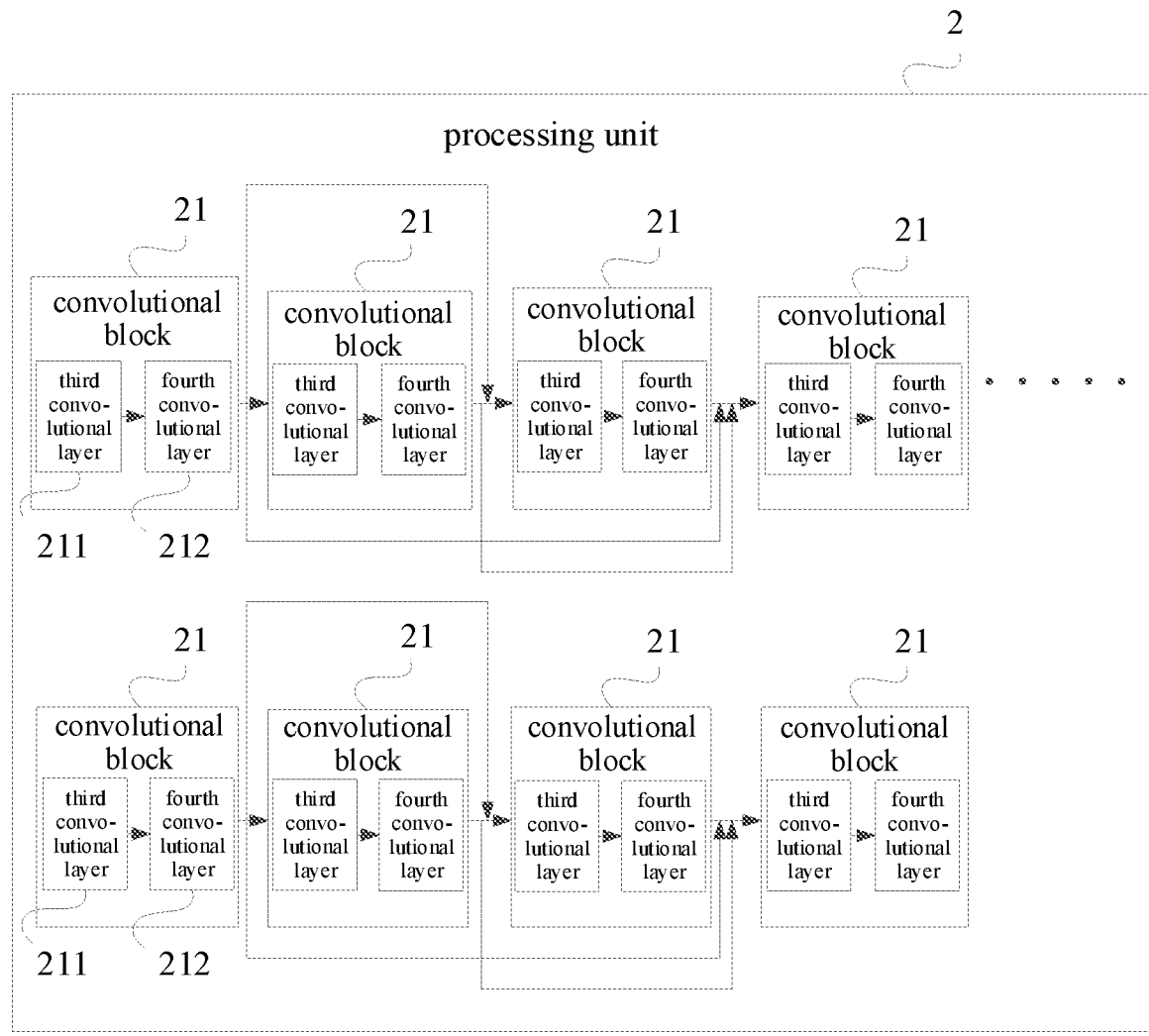
FIG. 4 is a structural schematic diagram of a processing unit provided by the embodiments of the present disclosure.

In one implementation mode, referring to FIG. 4, the processing unit 2 includes a plurality of convolutional blocks 21 connected in sequence, and output of each convolutional block 21 is input of all the subsequent convolutional blocks 21, where each convolutional block 21 includes a third convolutional layer 211 and a fourth convolutional layer 212.

Exemplary, the processing unit 2 is a dense connected convolutional network (DenseBlock). Each DenseBlock includes the plurality of convolutional blocks 21 connected in sequence, where the output of each convolutional block 21 is not only input to the next convolutional block 21, but also input to all the later convolutional blocks 21 of the next convolutional block 21 at the same time, for example, input to all the later convolutional blocks 21 of the next convolutional block 21 through a contact function, and correspondingly, the input of each convolutional block 21 is the output of all the previous convolutional blocks of it.

In the solution provided by the embodiments of the present disclosure, the structure of each convolutional block 21 may be a "B+C" structure, where B refers to a bottleneck layer, i.e., the third convolutional layer 211, which is used for dimensionality reduction of data so as to reduce the number of parameters in subsequent convolutional operation; and C refers to a convolution layer, that is, the fourth convolutional layer, which is used to perform convolutional averaging on the data.

In one implementation mode, referring to FIG. 3, the convolutional neural network further includes N+1 fifth convolutional layers 5, where the fifth convolutional layers 5 are disposed at the input end of processing unit 2 and each of the second convolutional layers 31, which are configured to perform superposition processing on a plurality of input data.

Exemplary, input of the processing unit 2 includes not only the output of the last first convolutional layer 11 in the first convolutional unit 1, but also the input preset noise information. The input of each second convolutional layer 31 includes not only the output of the previous second convolutional layer 31, but also the output of the corresponding first convolutional layer 11. Therefore, in the solution provided in the embodiments of the present disclosure, both the processing unit 2 and the second convolutional layers 31 have a plurality of input data. Both the processing unit 2 and the second convolutional layers 31 perform convolutional operation on the input data and the convolutional weight of each convolutional kernel. In order that the output data of the processing unit 2 or the second convolutional layers 31 contains information of all the input data, the fifth convolutional layer 5 is arranged at the input end of the processing unit 2 or each input end of the second convolutional layers 31, and the plurality of input data are superimposed so that the processing unit 2 or the second convolutional layers 31 perform convolutional operation on the superimposed data.

In one implementation mode, the noise information output to the convolutional neural network includes first noise information and second noise information, where the difference between the average value of all elements in the first noise information and the maximum luminance grayscale is smaller than a first preset threshold, and the difference between the average value of all elements in the second noise information and the minimum luminance grayscale is smaller than a second preset threshold. For example, both the first noise information and the second noise information are the Gaussian noise information, and the average value of all elements in the first noise information or in the second noise information are an average value of the Gaussian noise.

Exemplary, the first noise information and the second noise information are both presented in the matrix form, and both the first noise information and the second noise information include luminance information, where the values of all the elements in the first noise information are not larger than the maximum luminance grayscale (255), the difference between the average value of all the elements and the maximum luminance grayscale is smaller than the first preset threshold; and the values of all elements in the second noise information is larger than the minimum luminance grayscale (0), and the difference between the average value of all elements and the minimum luminance grayscale is smaller than the second preset threshold. For example, the value range of the first preset threshold is [0-5], and the value range of the second preset threshold is [0-5].

In one implementation mode, in order to reduce the calculation amount of image processing in the convolutional neural network, each first convolutional layer 11, each second convolutional layer 31, each third convolutional layer 211, each fourth convolutional layer 212, and each fifth convolutional layer 5 include a 1×1 convolutional kernel.

In the solution provided by the embodiments of the present disclosure, the convolutional neural network includes the first convolutional unit 1, the processing unit 2 and the second convolutional unit 3; and the image to be processed is input into the first convolutional unit 1, the N feature maps with different scales are extracted through the first convolutional unit 1. Then the first feature map with the smallest scale extracted by the first convolutional unit 1 is input into the processing unit 2, the first feature map and the noise information received by the processing unit 2 are fused to obtain the second feature map, and the second feature map is fused with the N feature maps with the different scales in the second convolutional unit 3 to obtain the processed image. Therefore, in the solution provided by the embodiments of the present disclosure, on the one hand, the image feature information in the image to be processed is extracted through the first convolutional unit 1, so that processing of other parameter information of the image to be processed in the convolutional neural network is avoided, which reduces the workload of image processing and improves the efficiency of image processing; on the other hand, the extracted image feature information and noise information are fused through the processing unit 2, so that the coverage of the image feature information is increased, which further increases image contrast and improves image quality.

Figure 5:
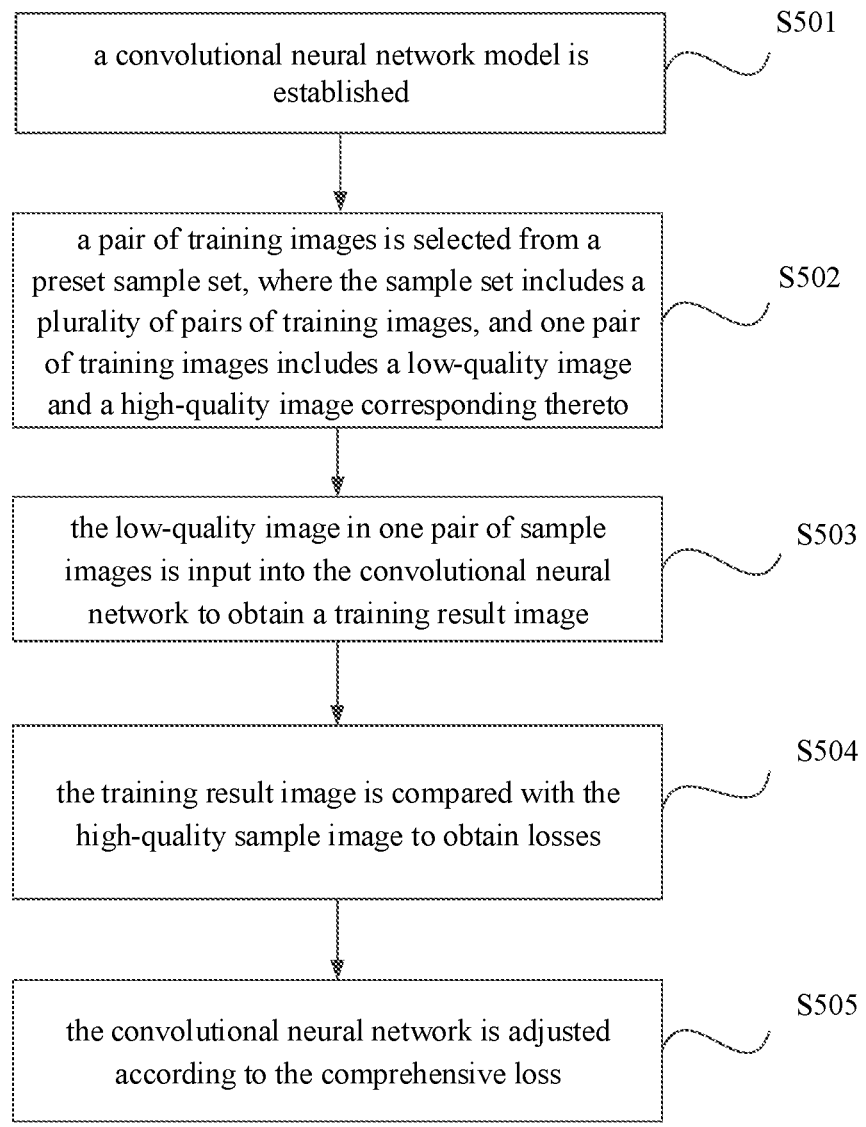
FIG. 5 is a training flowchart of a convolutional neural network provided by the embodiments of the present disclosure.

Further, in the solution provided in the embodiments of the present disclosure, an image processing method is performed by using the above-mentioned convolutional neural network, so the convolutional neural network needs to be established through training before the image processing. The training process of the convolutional neural network will be described in detail below. Specifically, referring to FIG. 5, the training process of the convolutional neural network includes the following steps.

Step 501, a convolutional neural network model is established.

According to the convolutional neural network structure described above, an initial convolutional neural network model is established.

Step 502, a pair of training images is selected from a preset sample set, where the sample set includes a plurality of pairs of training images, and one pair of training images includes a low-quality image and a high-quality image corresponding thereto.

A plurality of pairs of image samples for convolutional neural network training are stored in a database of an electronic device in advance. One pair of image samples includes two images with the same content but different contrast ratios, where the image with a high contrast ratio in the pair of image samples is a high-quality image and the image with a low contrast ratio is a low-quality image.

Step 503, the low-quality image in one pair of sample images is input into the convolutional neural network to obtain a training result image.

Step 504, the training result image is compared with the high-quality sample image to obtain losses.

The losses refer to the difference between the training result image and the high-quality sample image, where the losses include at least one of L1 loss, content loss, countermeasure loss or color loss.

Figure 6:
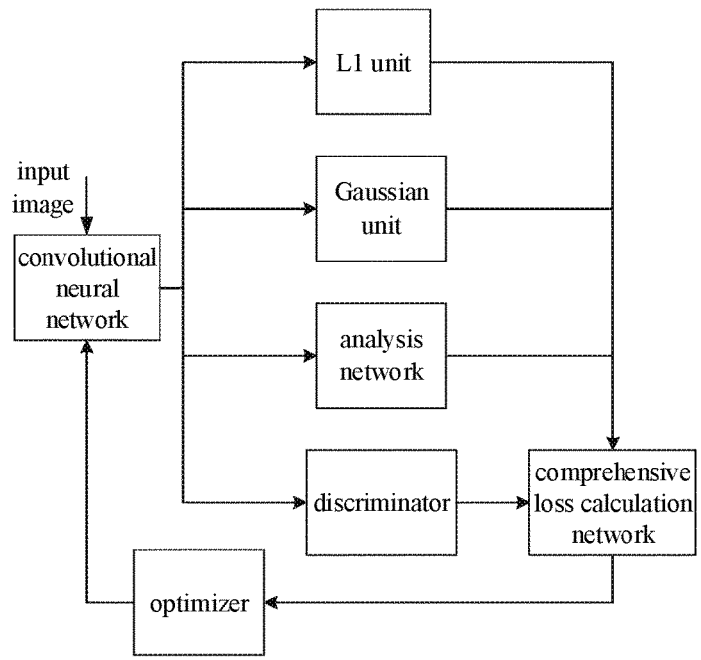
FIG. 6 is a structural schematic diagram of a convolutional neural network generator provided by the embodiments of the present disclosure.

Exemplary, referring to FIG. 6 which is a structural schematic diagram of a convolutional neural network generator provided by the embodiments of the present disclosure, the generator includes a convolutional neural network, an L1 unit, a Gaussian unit, an analysis network, a discriminator, a comprehensive loss calculation network, and an optimizer. The L1 unit is configured to calculate the L1 loss, the Gaussian unit is configured to calculate the color loss, the analysis network is configured to calculate the content loss, the discriminator is configured to calculate the countermeasure loss, and the optimizer is configured to adjust the convolutional neural network according to the L1 loss, the content loss, the countermeasure loss and the color loss.

The low-quality sample image in one pair of sample images is input into the convolutional neural network to obtain the output training result image, and the high-quality sample image in the pair of sample images and the training result image output by the convolutional neural network are input into the L1 unit, the Gaussian unit, the analysis network and the discriminator to calculate the losses.

In order to facilitate understanding of the calculation process of various losses, the structure and calculation process of each unit in the generator for calculating the losses will be described in detail below.

1. The L1 unit calculates the L1 loss by the following formula:

$$L1 = 0.299*(abs(R_i - R_g)) + 0.587*(abs(G_i - G_g)) + 0.114(abs(B_i - B_g))$$

where $R_i$, $G_i$, $B_i$ are red, green and blue components in the training result image respectively; $R_i$, $R_i$, $B_g$ are red, green and blue components in the high-quality sample image; and abs( ) means absolute value operation.

2. The Gaussian unit calculates the color loss by the following formula:

$$L_{color} = abs(gaussian(I) - (gaussian(G))$$

where $L_{color}$ represents the color loss; gaussian( ) represents Gaussian blur operation; I represents the training result image; and G represents the high-quality sample image.

3. The content loss is calculated by the analysis network.

Figure 7:
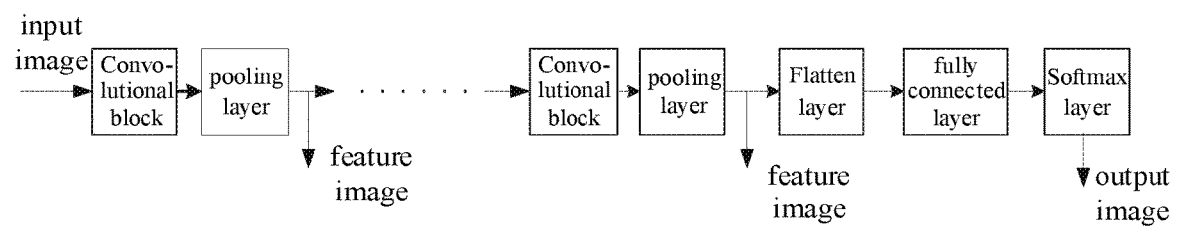
FIG. 7 is a structural schematic diagram of an analysis network provided by the embodiments of the present disclosure.

Exemplary, referring to FIG. 7, the analysis network includes a plurality of convolutional layers and pooling layers between every two adjacent convolutional layers, where each convolutional layer is configured to extract feature maps in the training result image and the high-quality sample image; and each pooling layer is configured to down-sample the extracted feature maps and inputting the down-sampled feature maps to the next convolutional layer. After being input to the analysis network, the training result image and the high-quality sample image pass through the plurality of convolutional layers and the plurality of pooling layers, so that the feature maps corresponding to the training result image and the feature maps corresponding to the high-quality sample image are obtained.

Then, according to the feature maps corresponding to the training result image and the feature maps corresponding to the high-quality sample image extracted by the analysis network, the content loss is calculated according to the following formula:

$$L_{content} = \frac{1}{2C_1} \sum_{ij} (I_{ij}^l - G_{ij}^l)^2$$

where $L_{content}$ represents the content loss; $C_1$ indicates a preset coefficient; $I_{ij}^l$ is the value at the $j^{th}$ position of the training result image in the feature map output by the $i^{th}$ convolutional kernel in the $l^{th}$ convolutional layer of the analysis network; and $G_{ij}^l$ is the value at the $j^{th}$ position of the high-quality sample image in the feature map output by the $i^{th}$ convolutional kernel in the $l^{th}$ convolutional layer of the analysis network.

Further, referring to FIG. 7, the analysis network provided by the embodiments of the present disclosure further includes flatten layers, fully connected layers and Softmax layers which are connected in sequence, where the flatten layers are configured to convert the output feature maps into a vector form; the fully connected layers have the same structure as the convolutional neural network, but the convolutional kernel of the convolutional layer of each fully connected layer is a scalar value; and the Softmax layers are used to compress the data output by the fully connected layer to obtain the probability that the output image belongs to each tag in the sample set. However, in the solution provided by the embodiments of the present disclosure, the analysis network only uses the feature maps to calculate the content loss.

4. The countermeasure loss is calculated by the discriminator.

Figure 8:
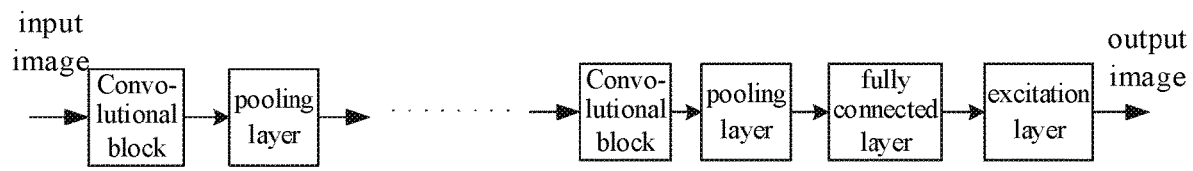
FIG. 8 is a structural schematic diagram of a discriminator provided by the embodiments of the present disclosure.

Exemplary, referring to FIG. 8 which is a structural schematic diagram of a discriminator provided by the embodiments of the present disclosure, the discriminator includes a plurality of convolutional blocks, fully connected layers, excitation layers and pooling layers between every two adjacent convolutional blocks, which are connected in sequence; where each convolutional block includes two convolutional layers; the excitation layers are configured to perform nonlinear mapping on output of the convolutional layers and converting output data into scalar data, and the specific excitation layer functions include the sigmoid function or the rectified linear unit (ReLU) function and the like.

Based on the above discriminator structure, the discriminator calculates the countermeasure loss by the following formula:

$$L_D = -E_{x \sim pdata(x)}[\log D(x)] - E_{z \sim pz(z)}[1 - \log D(G(z))]$$

where $L_D$ represents the countermeasure loss; D represents the discriminator; pdata represents a set of high-quality images in the sample set; x represents items in the set pdata; pz represents a set of low-quality images in the sample set; z represents items in the set pz; $E_{x \sim pdata(x)}$ represents any item in the set pdata; and $E_{z \sim pz(z)}$ represents any item in the set pz.

In the solution provided by the embodiments of the present disclosure, the discriminator is a classification network for verifying whether the training result image is a high-quality image or not and outputting a verification result 0 or 1, where the output result 0 indicates that the training result image is not a high-quality image and the output result 1 indicates that the training result image is a high-quality image.

Further, the discriminator should be trained before calculating the countermeasure loss through the discriminator, and the training process of the discriminator will be described in detail below.

Figure 9:
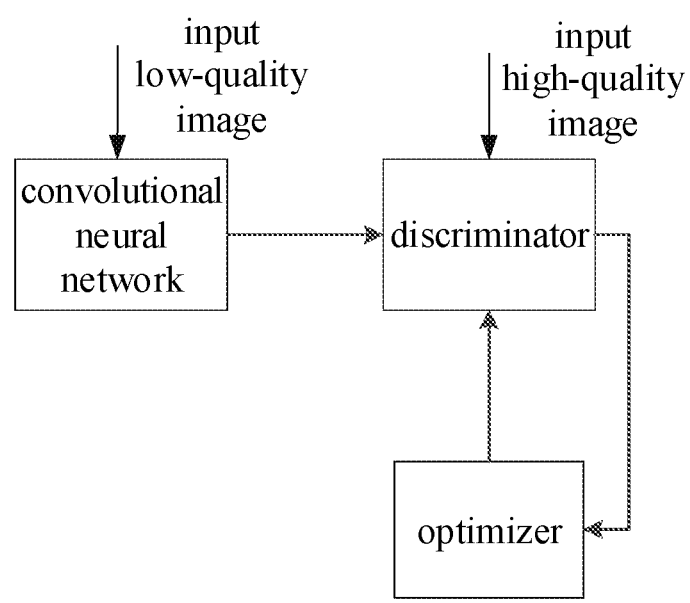
FIG. 9 is a data flow diagram of discriminator training provided by the embodiments of the present disclosure.

Referring to FIG. 9, a data flow diagram of discriminator training provided by the embodiments of the present disclosure is shown. Specifically, after the training result image output by the convolutional neural network and the high-quality image in the sample set are input to the discriminator, the countermeasure loss is calculated based on the above-mentioned countermeasure loss calculation formula; and the countermeasure loss is input to the optimizer, and the optimizer optimizes and adjusts parameters in the discriminator based on the countermeasure loss, such as, the number of the convolutional blocks.

Further, in the solution provided by the embodiments of the present disclosure, after the L1 loss, the content loss, the countermeasure loss and the color loss are calculated, all the losses are input to a comprehensive calculation network to calculate a comprehensive loss representing the total loss degree. There are many ways to calculate the comprehensive loss in the embodiments of the present disclosure, which is not limited here. For example, the comprehensive loss can be obtained by multiplying the L1 loss, the content loss, the countermeasure loss and the color loss by corresponding weights respectively, and then performing summation.

Step 505, the convolutional neural network is adjusted according to the comprehensive loss.

The above-mentioned losses represent the difference between the training result image and the high-quality sample image, so parameters in the convolutional neural network can be adjusted according to the above-mentioned losses, for example, the weight matrix of the convolutional kernel in each convolutional layer of the convolutional neural network, or the number of the convolutional layers.

According to the embodiments of the present disclosure, after the convolutional neural network is trained based on the training method, the input image is processed based on the trained convolutional neural network to obtain the high-quality image. The following is a detailed description of the image processing process by the convolutional neural network processor.

Referring to FIG. 10, the embodiments of the present disclosure provide an image processing method applied to the convolutional neural network as shown in FIG. 3, and the method includes:

step 1001, a first convolutional unit receives an input image to be processed, N feature maps with different scales in the image to be processed are extracted, the N feature maps are sent to a second convolutional unit, and a first feature map is sent to a processing unit, where N is a positive integer, the first feature map is the feature map with the smallest scale in the N feature maps, the image to be processed and the feature maps are all presented in a matrix form, and the feature maps represent image feature information, such as luminance information of the image to be processed.

In the solution provided by the embodiments of the present disclosure, the first convolutional unit extracts the feature maps of the image to be processed in a variety of ways, and the following description will take an implementation mode as an example.

Extracting, by the first convolutional unit, the N feature maps with different scales in the image to be processed includes: each first convolutional layer in the first convolutional unit acquires a preset first convolutional weight matrix; and each first convolutional layer performs convolutional operation on a feature map output by the previous adjacent convolutional layer and the first convolutional weight matrix corresponding to the each first convolutional layer to obtain the N feature maps with the different scales.

Exemplary, in the training process of the convolutional neural network, the convolutional weight matrix corresponding to each convolutional layer can be optimized and stored in a database. When image processing through the convolutional neural network is performed, the first convolutional weight matrix corresponding to each first convolutional layer is obtained based on a preset relationship between each first convolutional layer and the corresponding convolutional weight matrix; and then each first convolutional layer performs convolutional operation on the input data and the corresponding first weight matrix to obtain a feature map.

In the solution provided by the embodiments of the present disclosure, the convolutional operation, performed by each first convolutional layer, on the feature map output by the previous adjacent convolutional layer and the first convolutional weight matrix corresponding to each first convolutional layer includes the following two cases:

Case 1: if any first convolutional layer is a first one of the convolutional layers in the first convolutional unit, the any first convolutional layer performs convolutional operation on the image to be processed and the first convolutional weight matrix corresponding to the any first convolutional layer to obtain a feature map.

For example, if the image to be processed is a matrix of 4×4×2 and the convolutional kernel of the first convolutional layer is a matrix of 3×3×2, the convolutional operation process of the image to be processed and the first weight matrix corresponding to the first convolutional layer in the first convolutional unit is as follows:

Referring to FIG. 11, in the 4×4×2 matrix of the image to be processed, the 3×3×2 image matrix in a dotted line frame and the 3×3×2 convolutional kernel are selected for convolutional operation to obtain a 2×2×2 feature map. Specifically, the calculation process of 8 element values in the feature map is as follows:

$$v1 = p1*k1 + p2*k2 + p3*k3 + p5*k4 + p6*k5 + p7*k6 + p9*k7 + p10*k8 + p11*k9.$$

Specific calculation of pixel data v2 in row 1 and column 2 in the first 2×2×1 matrix in the output image is as follows:

$$v2 = p2*k1 + p3*k2 + p4*k3 + p6*k4 + p7*k5 + p8*k6 + p10*k7 + p11*k8 + p12*k9.$$

By analogy, specific calculation of pixel data v3 in row 2 and column 1 in the first 2×2×1 matrix in the output image is as follows:

$$v3 = p5*k1 + p6*k2 + p7*k3 + p9*k4 + p10*k5 + p11*k6 + p13*k7 + p14*k8 + p15*k9.$$

Specific calculation of pixel data v4 in row 2 and column 2 in the first 2×2×1 matrix in the output image is as follows:

$$v4 = p6*k1 + p7*k2 + p8*k3 + p10*k4 + p11*k5 + p12*k6 + p14*k7 + p15*k8 + p16*k9.$$

Similarly, specific calculation of pixel data v1-1 and v1-2 in row 1 in the second 2×2×1 matrix in the output image is as follows:

$$v1-1 = p1-1*k1 + p1-2*k2 + p1-3*k3 + p1-5*k4 + p1-6*k5 + p1-7*k6 + p1-9*k7 + p1-10*k8 + p1-11*k9;$$

$$v1-2 = p1-2*k1 + p1-3*k2 + p1-4*k3 + p1-6*k4 + p1-7*k5 + p1-8*k6 + p1-10*k7 + p1-11*k8 + p1-12*k9.$$

By analogy, specific calculation of pixel data v1-3 and v1-4 in row 2 of the second 2×2×1 matrix in the output image is as follows:

$v1\text{-}3 = p1\text{-}5*k1 + p1\text{-}6*k2 + p1\text{-}7*k3 + p1\text{-}9*k4 + p1\text{-}10*k5 + p1\text{-}11*k6 + p1\text{-}13*k7 + p1\text{-}14*k8 + p1\text{-}15*k9;$ $v1\text{-}4 = p1\text{-}6*k1 + p1\text{-}7*k2 + p1\text{-}8*k3 + p1\text{-}10*k4 + p1\text{-}11*k5 + p1\text{-}12*k6 + p1\text{-}14*k7 + p1\text{-}15*k8 + p1\text{-}16*k9.$ Case 2: if any first convolutional layer is not the first one of the convolutional layers in the first convolutional unit, the any first convolutional layer performs convolutional operation on the feature map output by the previous adjacent first convolutional layer and the first convolutional weight matrix corresponding to the any first convolutional layer to obtain a feature map.

Specifically, the process of performing convolutional operation on the feature map output from the previous adjacent first convolutional layer and the first convolutional weight matrix corresponding to any first convolutional layer is similar to the process of performing convolutional operation on the image to be processed and the first convolutional weight matrix, and will not be repeated here.

Step 1002, the processing unit fuses the received preset noise information and the first feature map, to obtain a second feature map, and the second feature map is sent to the second convolutional unit, where the noise information includes preset luminance information.

After extracting the N feature maps of the image to be processed, the first convolutional unit outputs the first feature map with the smallest scale (the feature map output by the last convolutional layer in the first convolutional unit) to the processing unit. The processing unit receives the first feature map and the input preset noise information, and the processing unit fuses the first feature map and the preset noise information to obtain the second feature map, where the processing unit fuses the first feature map and the preset noise information to obtain the second feature map in a variety of ways, which will be described below by taking an implementation mode as an example.

The Fifth convolutional layer between the processing unit and the first convolutional unit receives the input noise information and the first feature map, and stack the first feature map and the noise information to obtain a fifth feature map; each convolutional block in the processing unit acquires a preset third convolutional weight matrix; and each convolutional block performs convolutional operation on the feature maps output by all previous convolutional blocks and the third convolutional weight matrix corresponding to the each convolutional block to obtain the second feature map.

Figure 12:
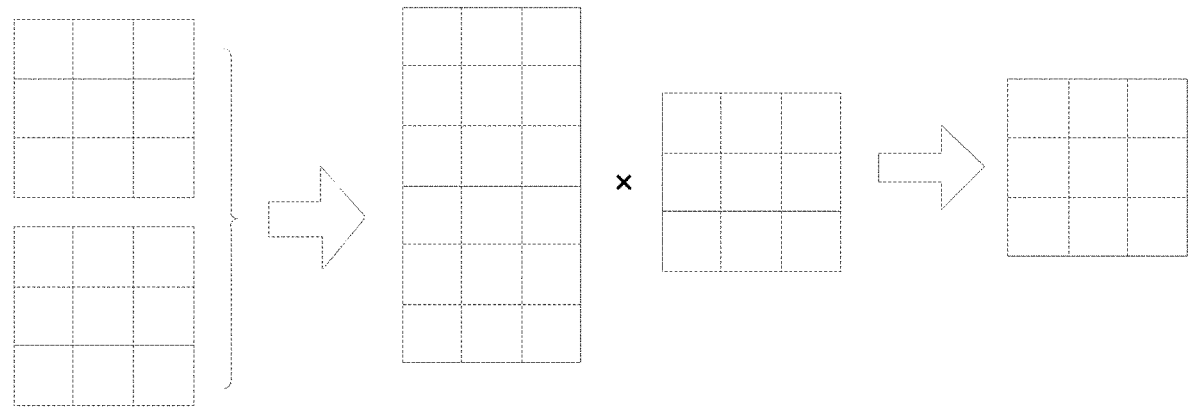
FIG. 12 is a principle diagram of convolutional layer data superposition provided by the embodiments of the present disclosure.

For example, if the first feature map is a 3×3 matrix, the noise information is also a 3×3 matrix, and the convolutional kernels in the fifth convolutional layers are 3×3 matrices. Referring to FIG. 12, after receiving the first feature map and the noise information, the fifth convolutional layers superimpose the two 3×3 matrices in dimension to obtain a 6×3 matrix, and then perform convolutional operation on the 6×3 matrix with the 3×3 convolutional kernels in the fifth convolutional layers to obtain the second feature map.

Step 1003, the second convolutional unit fuses the received N feature maps with the second feature map to obtain a processed image.

Fusing, by the second convolutional unit, the received N feature maps with the second feature map to obtain the processed image includes: each second convolutional layer in the second convolutional unit acquires a preset second convolutional weight matrix; and each second convolutional layer performs convolutional operation on a feature map output by the corresponding first convolutional layer and a feature map output by the previous adjacent second convolutional layer to obtain the processed image.

In the solution provided by the embodiments of the present disclosure, the convolutional operation, by the N second convolutional layers, on the feature map output by the corresponding first convolutional layer and the feature map output by the previous adjacent second convolutional layer to obtain the processed image also includes two following cases:

Case 1: if any second convolutional layer is a first one of the second convolutional layers in the second convolutional unit, convolutional operation is performed on a third feature map and the second convolutional weight matrix corresponding to the any second convolutional layer to obtain a feature map, where the third feature map is obtained by stacking the received first feature map and the second feature map by a fifth convolutional layer.

Case 2: if any second convolutional layer is not the first one of the second convolutional layers in the second convolutional unit, the feature map output by the previous adjacent second convolutional layer is stacked with the feature map output by the corresponding first convolutional layer to obtain a fourth feature map, and convolutional operation is performed on the fourth feature map and the second convolutional weight matrix corresponding to the any second convolutional layer to obtain a feature map.

Specifically, the process of performing convolutional operation on the input feature map and the corresponding second convolutional weight matrix by any second convolutional layer is similar to the process of performing convolutional operation on the input feature map and the corresponding first convolutional weight matrix by the first convolutional layer, and is not repeated here.

Further, in order to reduce the calculation amount in the convolution operation process, the dimensions of each first convolutional weight matrix, each second convolutional weight matrix, and each third convolutional weight matrix are all 1×1.

In the solution provided by the embodiments of the present disclosure, the first convolutional unit extracts the N feature maps with different scales from the image to be processed; the processing unit fuses the received preset noise information with the first feature map with the smallest scale extracted by the first convolutional unit to obtain the second feature map, and sends the second feature map to the second convolutional unit; and the second convolutional unit fuses the received N feature maps with the second feature map to obtain the processed image. Therefore, in the solution provided by the embodiments of the present disclosure, the first convolutional unit only extracts the image feature information feature map in the image to be processed, which reduces the workload of image processing and improves the efficiency of image processing; and the extracted image feature information and noise information are fused through the processing unit, so that the coverage of the image feature information is increased, which increases image contrast and improves image quality.

Further, in order to reduce the calculation amount in the image processing process and improve the image processing efficiency, in step 1002 of the embodiments of the present disclosure, after the convolutional operation of the image to be processed and the first convolutional weight matrix corresponding to the any first convolutional layer is performed, or after the convolutional operation of the feature map output from the previous adjacent first convolutional layer and the first convolutional weight matrix corresponding to the any first convolutional layer is performed, the method further includes:

a scrambling unit down-samples the obtained feature map.

In step 1003 of the present embodiment, after the convolutional operation of the third feature map and any second convolutional weight matrix to obtain a feature map is performed, or after the convolutional operation of the fourth feature map and the second convolutional weight matrix corresponding to the any second convolutional layer to obtain a feature map is performed, the method further includes:

a merging unit up-samples the feature map.

Figure 13:
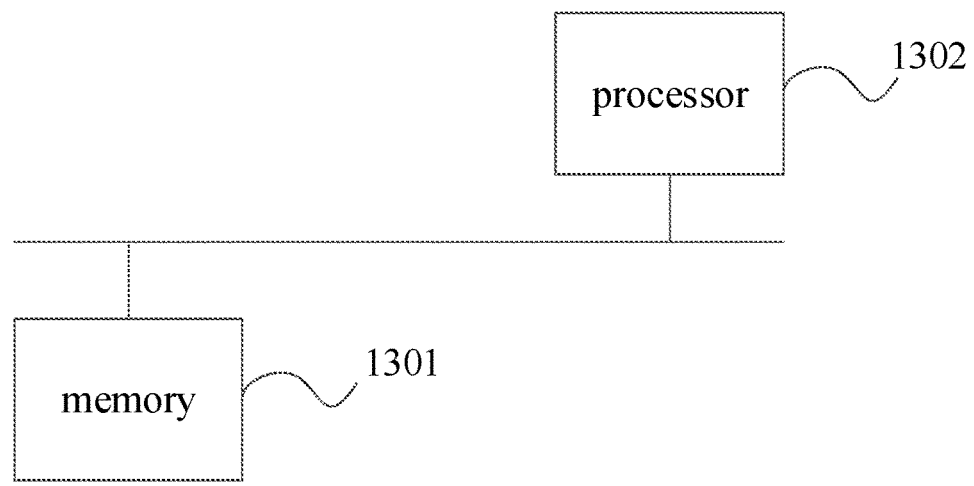
FIG. 13 is a structural schematic diagram of an electronic device provided by the embodiments of the present disclosure.

Referring to FIG. 13, the embodiments of the present disclosure provide an electronic device, and the electronic device includes:

a memory 1301 for storing instructions executed by at least one processor; and the processor 1302 for acquiring and executing the instructions stored in the memory to implement the above image processing method.

The embodiments of the present disclosure provide a computer-readable storage medium, and the computer-readable storage medium stores computer instructions that, cause the computer to perform the above image processing method when executed on a computer.

Those skilled in the art will understand that the embodiments of the present disclosure may be provided as methods, systems, or computer program products. Therefore, the present disclosure may take the form of a full hardware embodiment, a full software embodiment, or an embodiment combining software and hardware aspects. Furthermore, the present disclosure may take the form of a computer program product implemented on one or more computer usable storage media (including but not limited to a magnetic disk memory, an optical memory, etc.) having computer usable program codes embodied therein.

The present disclosure is described with reference to flowcharts and/or block diagrams of the method, device (system), and the computer program product according to the embodiments of the present disclosure. It should be understood that each flow and/or block in the flowcharts and/or block diagrams, and combinations of flows and/or blocks in the flowcharts and/or block diagrams may be implemented by computer program instructions. These computer program instructions may be provided to processors of a general purpose computer, special purpose computer, an embedded processor, or other programmable data processing apparatus to produce a machine, such that the instructions executed by the processor of the computer or the other programmable data processing apparatus produce a device for implementing the functions specified in one or more flows in the flowcharts and/or one or more blocks in the block diagrams.

These computer program instructions may also be stored in a computer-readable memory which can direct the computer or the other programmable data processing apparatus to function in a particular manner, such that the instructions stored in the computer-readable memory produce an article of manufacture including an instruction device which implements the functions specified in one or more flows in the flowcharts and/or one or more blocks in the block diagrams.

These computer program instructions may also be loaded onto the computer or the other programmable data processing apparatus such that a series of operational steps are performed on the computer or other programmable apparatus to produce a computer implemented process, such that the instructions executed on the computer or other programmable apparatus provide steps for implementing the functions specified in one or more flows in the flowcharts and/or one or more blocks in the block diagrams.

Obviously, those skilled in the art can make various changes and modifications to the present disclosure without departing from the spirit and scope of the present disclosure. Thus, if these modifications and variations of the present disclosure fall within the scope of the claims of the present disclosure and their equivalents, the present disclosure is also intended to comprise these modifications and variations.

What is claimed is:

1. A convolutional neural network processor, comprising a first convolutional unit, a processing unit and a second convolutional unit, wherein
    the first convolutional unit comprises N first convolutional layers connected in sequence, and is configured to extract N feature maps with different scales in an image to be processed, wherein N is a positive integer, each first convolutional layer is configured to extract one feature map;
    the processing unit is connected with the first convolutional unit and the second convolutional unit, and is configured to fuse at least one piece of preset noise information received and a first feature map with a smallest scale in the N feature maps with different scales extracted by the first convolutional unit to obtain a fused second feature map; and
    the second convolutional unit comprises N second convolutional layers connected in sequence, and is configured to fuse the N feature maps extracted by the first convolutional unit with the second feature map to obtain a processed image.

2. The convolutional neural network processor according to claim 1, further comprising: 2N sampling units;
    wherein first N sampling units are scrambling units, an output end of each first convolutional layer is provided with a scrambling unit, which is configured to down-sample a feature image output by each first convolutional layer, and output of each scrambling unit serves as input of next first convolutional layer; and
    last N sampling units are merging units, and an output end of each second convolutional layer is provided with a merging unit, which is configured to up-sample a feature image output by each second convolutional layer.

3. The convolutional neural network processor according to claim 1, further comprising N interlayer connections configured to directly input an output of each first convolutional layer into a corresponding second convolutional layer;
    wherein the first convolutional layers are in one-to-one correspondence to the second convolutional layers.

4. The convolutional neural network processor according to claim 3, wherein the processing unit comprises a plurality of convolutional blocks connected in sequence, and output of each of the convolutional blocks is input of all subsequent convolutional blocks;
    wherein each of the convolutional blocks comprises a third convolutional layer and a fourth convolutional layer.

5. The convolutional neural network processor according to claim 4, further comprising: N+1 fifth convolutional layers;
wherein the fifth convolutional layers are disposed at input ends of the processing unit and each of the second convolutional layers for performing superposition processing on a plurality of input data.

6. The convolutional neural network processor according to claim 5, wherein each first convolutional layer, each second convolutional layer, each third convolutional layer, each fourth convolutional layer, and each fifth convolutional layer comprise a 1×1 convolutional kernel, respectively.

7. The convolutional neural network processor according to claim 1, wherein the noise information comprises first noise information and second noise information;
wherein a difference between an average value of all elements in the first noise information and a maximum luminance grayscale is smaller than a first preset threshold, and a difference between an average value of all elements in the second noise information and a minimum luminance grayscale is smaller than a second preset threshold.

8. An image processing method, applied to the convolutional neural network processor according to claim 1, comprising:
receiving, by the first convolutional unit, the input image to be processed, extracting the N feature maps with different scales in the image to be processed, sending the N feature maps to the second convolutional unit, and sending the first feature map to the processing unit, wherein N is the positive integer, the first feature map is the feature map with the smallest scale in the N feature maps with different scales;
fusing, by the processing unit, the received preset noise information and the first feature map, to obtain the second feature map, and sending the second feature map to the second convolutional unit; and
fusing, by the second convolutional unit, the received N feature maps with the second feature map to obtain the processed image.

9. The image processing method according to claim 8, wherein the extracting the N feature maps with different scales in the image to be processed comprises:
acquiring, by each first convolutional layer in the first convolutional unit, a preset first convolutional weight matrix; and
performing, by each first convolutional layer, convolutional operation on a feature map output by a previous adjacent convolutional layer and the first convolutional weight matrix corresponding to the each first convolutional layer, to obtain the N feature maps with the different scales.

10. The image processing method according to claim 9, wherein the convolutional operation, performed by each first convolutional layer, on the feature map output by the previous adjacent convolutional layer and the first convolutional weight matrix corresponding to each first convolutional layer comprises:
if any first convolutional layer is a first one of the convolutional layers in the first convolutional unit, performing, by the any first convolutional layer, convolutional operation on the image to be processed and a first convolutional weight matrix corresponding to the any first convolutional layer to obtain a feature map; or
if any first convolutional layer is not the first one of the convolutional layers in the first convolutional unit, performing, by the any first convolutional layer, convolutional operation on the feature map output by the previous adjacent first convolutional layer and a first convolutional weight matrix corresponding to the any first convolutional layer to obtain a feature map.

11. The image processing method according to claim 10, wherein after the convolutional operation on the image to be processed and the first convolutional weight matrix corresponding to the any first convolutional layer is performed, or after the convolutional operation on the feature map output by the previous adjacent first convolutional layer and the first convolutional weight matrix corresponding to the any first convolutional layer is performed, the method further comprises:
down-sampling, by a scrambling unit, the obtained feature map.

12. The image processing method according to claim 8, wherein the fusing, by the second convolutional unit, the received N feature maps with the second feature map to obtain the processed image comprises:
acquiring, by each second convolutional layer in the second convolutional unit, a preset second convolutional weight matrix; and
performing, by each second convolutional layer, convolutional operation on a feature map output by a corresponding first convolutional layer and a feature map output by a previous adjacent second convolutional layer to obtain the processed image.

13. The image processing method according to claim 12, wherein the convolutional operation, performed by each second convolutional layer, on the feature map output by the corresponding first convolutional layer and the feature map output by the previous adjacent second convolutional layer to obtain the processed image comprises:
if any second convolutional layer is a first one of the convolutional layers in the second convolutional unit, performing convolutional operation on a third feature map and the second convolutional weight matrix corresponding to the any second convolutional layer to obtain a feature map, wherein the third feature map is obtained by stacking a received first feature map and the second feature map by a fifth convolutional layer; or
if any second convolutional layer is not the first one of the convolutional layers in the second convolutional unit, stacking the feature map output by the previous adjacent second convolutional layer with a feature map output by a corresponding first convolutional layer to obtain a fourth feature map, and performing convolutional operation on the fourth feature map and the second convolutional weight matrix corresponding to the any second convolutional layer to obtain a feature map.

14. The image processing method according to claim 13, wherein after the convolutional operation on the third feature map and the any second convolutional weight matrix to obtain the feature map is performed, or after the convolutional operation on the fourth feature map and the second convolutional weight matrix corresponding to the any second convolutional layer to obtain the feature map is performed, the method further comprises:
up-sampling, by a merging unit, the feature map.

15. The image processing method according to claim 14, wherein the fusing, by the processing unit, the received preset noise information and the first feature map, to obtain the second feature map comprises:
receiving, by a fifth convolutional layer between the processing unit and the first convolutional unit, the input noise information and the first feature map, and stacking the first feature map and the noise information to obtain a fifth feature map;

acquiring, by each convolutional block in the processing unit, a preset third convolutional weight matrix; and performing, by each convolutional block, convolutional operation on the feature maps output by all previous convolutional blocks and the third convolutional weight matrix corresponding to each convolutional block to obtain the second feature map.

16. The image processing method according to claim 15, wherein the dimensions of each first convolutional weight matrix, each second convolutional weight matrix, and each third convolutional weight matrix are all 1×1.

17. An electronic device, comprising:
- a memory for storing instructions executed by at least one processor; and
- the processor for acquiring and executing the instructions stored in the memory to implement the method according to claim 8.

* * * * *